(12) United States Patent
Price et al.

(10) Patent No.: US 10,257,660 B2
(45) Date of Patent: Apr. 9, 2019

(54) SYSTEMS AND METHODS OF SOURCING HOURS OF OPERATION FOR A LOCATION ENTITY

(71) Applicant: Google Inc., Mountain View, CA (US)

(72) Inventors: Thomas Price, San Francisco, CA (US); Tuna Toksoz, Mountain View, CA (US)

(73) Assignee: Google LLC, Mountain View, CA (US)

( * ) Notice: Subject to any disclaimer, the term of this patent is extended or adjusted under 35 U.S.C. 154(b) by 550 days.

(21) Appl. No.: 14/978,252

(22) Filed: Dec. 22, 2015

(65) Prior Publication Data

US 2017/0177723 A1 Jun. 22, 2017

(51) Int. Cl.
  *G06F 17/30* (2006.01)
  *H04W 4/04* (2009.01)
  *G06Q 30/02* (2012.01)

(52) U.S. Cl.
  CPC ......... *H04W 4/04* (2013.01); *G06F 17/30864* (2013.01); *G06Q 30/0205* (2013.01)

(58) Field of Classification Search
  None
  See application file for complete search history.

(56) References Cited

U.S. PATENT DOCUMENTS

| | | | |
|---|---|---|---|
| 9,154,915 B2 | 10/2015 | Fabrikant et al. | |
| 2009/0271400 A1* | 10/2009 | Uchida | G01C 21/32 |
| 2012/0003964 A1* | 1/2012 | Soo | G06F 17/3087 |
| | | | 455/414.1 |
| 2012/0303412 A1* | 11/2012 | Etzioni | G06Q 30/06 |
| | | | 705/7.31 |
| 2016/0180467 A1* | 6/2016 | Griffin | G06Q 40/08 |
| | | | 705/4 |

* cited by examiner

*Primary Examiner* — Jau Shya Meng
(74) *Attorney, Agent, or Firm* — Dority & Manning, P.A.

(57) ABSTRACT

Computer-implemented methods and systems for sourcing hours of operation for a business or other location entity can include receiving a request to update hours of operation. A number of mobile devices present at the location entity during one or more periods of time can be determined based at least in part on a collection of time-stamped mobile device location data that identifies mobile devices associated with discrete users present at the location entity. The number of mobile devices and initial operating hours for the location entity can be provided as input to a statistical model (e.g., neural network, support-vector machine (SVM) or logistic regression model). An output of the model can indicate a likelihood that operating hours for the location entity have changed relative to the initial operating hours. The operating hours for the location entity can then be updated based at least in part on the model output.

20 Claims, 5 Drawing Sheets

SYSTEMS AND METHODS OF SOURCING HOURS OF OPERATION FOR A LOCATION ENTITY

FIELD

The present disclosure relates generally to sourcing hours of operation for location entities, and more particularly to determining updated hours of operation for businesses and other location entities using models applied to mobile device location data.

BACKGROUND

Numerous online websites, applications and other Internet-accessible programs can provide databases of information for businesses or other location entities. Known examples include web search engines (e.g., "Google Search") or mapping applications (e.g., "Google Maps") offered by Google, Inc. and others, business review websites hosted by Yelp, Inc. or others, and still further online services. These online services rely on and document the hours of operation for businesses and other location entities. Operating hours generally correspond to the daily, weekly or monthly patterns of when a business or other location entity is open. Changes in operating hours can arise from a variety of circumstances, including but not limited to shortening or extending an opening time or a closing time. Businesses can also open or close without properly updating these changes in databases of information for the business.

Creating and maintaining a comprehensive database of accurate operating hours for all businesses can be significantly expensive. Contacting every business in, for example, the United States to inquire about their hours would be very labor intensive, particularly if the process is regularly repeated to detect changes in business hours. At the same time, records of business hours are often relied upon by users of search engines, so incorrect records can be inconvenient to the user. Accordingly, there is a need for a relatively low-cost, accurate technique for identifying the operating hours of businesses and other location entities.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method of sourcing hours of operation for a location entity. The method can include receiving, by one or more computing devices, a request to update the hours of operation for a location entity. The method also can include determining, by the one or more computing devices, a number of mobile devices present at the location entity during one or more periods of time based at least in part on a collection of time-stamped mobile device location data. The collection of time-stamped mobile device location data can identify one or more mobile devices associated with one or more users as present at the location entity. The method also can include providing, by the one or more computing devices, the number of mobile devices and initial operating hours for the location entity as input to a model. The method also can include determining, by the one or more computing devices, an output of the model indicative of a likelihood that operating hours for the location entity have changed relative to the initial operating hours. The method also can include updating, by the one or more computing devices, the operating hours for the location entity based at least in part on the output of the model.

Other example aspects of the present disclosure are directed to systems, apparatus, tangible, non-transitory computer-readable media, user interfaces, memory devices, and electronic devices for sourcing hours of operation for a location entity.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
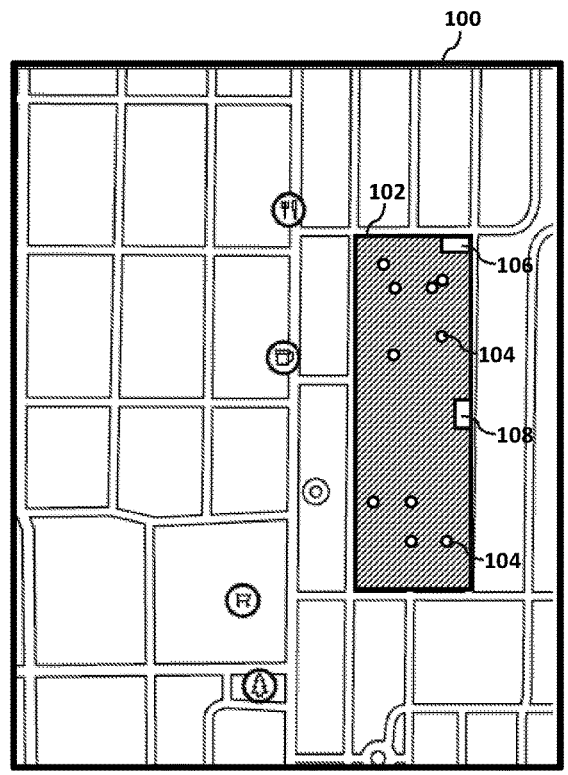
FIG. 1 provides an example overview of mobile device location data used for sourcing hours of operation for a location entity according to example aspects of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

In some embodiments, in order to obtain the benefits of the techniques described herein, a user may be provided with controls allowing the user to make an election as to both if and when systems, programs or features described herein may enable collection of user information (e.g., information about a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Example aspects of the present disclosure are directed to systems and methods of sourcing hours of operation for a location entity, and more particularly to sourcing hours of operation for businesses and other location entities from mobile device location data using machine learning prediction algorithms.

Identifying correct hours of operation for a business can be important in a variety of particular applications. Changes in operating hours can arise from a variety of circumstances, including but not limited to shortening or extending an opening time or a closing time. Businesses can also open or close without properly updating these changes in databases of information for the business. Some known solutions for tracking these types of updates typically rely on human curation, for example, manually calling all businesses in a database to confirm hours of operation. This process can take a substantial amount of time and requires contact with all businesses in order to identify those having changes in their operating hours. Other known solutions rely on crowd-sourcing techniques. However, business customers often have little incentive to provide updates to operating hours or other corrected information for a business. As such, alternative technologies for sourcing updated business information including operating hours are needed.

Some embodiments according to example aspects of the present disclosure can involve receiving a request to update the hours of operation for a location entity. Update requests can be received or initiated in a variety of different manners. For example, update requests can be initiated automatically on a periodic schedule to review and update hours of operation for some or all business listings in a database. In other examples, update requests can be manually initiated upon receiving a request indicating a possibility that operating hours are incorrect.

Data from a collection of mobile devices located at a business or other location entity can be accessed and analyzed to facilitate the updating of operating hours. The mobile device location data can originate from regular syncing of location histories and times collected from mobile devices, which can optionally be aggregated and analyzed to determine a number of unique users who are in different location entities at different times of day and days of the week. The mobile device location data may not be tethered to the identity of individual users in order to determine a number of unique users present at one or more particular times. Location entities can include any feature, landmark, point of interest (POI), or other object or event associated with a geographic location. For instance, a location entity can include a business, restaurant, church, residence, retail outlet, coffee shop, bar, music venue, attraction, museum, theme park, arena, stadium, festival, organization, region, neighborhood, or other suitable points of interest; or subsets of another location entity; or a combination of multiple contiguous location entities frequently visited in a single visit.

The number of mobile devices present at a location entity during one or more periods of time can be provided as input to a model, along with a presumed set of initial operating hours which can be known or unknown. The one or more periods of time can be partitioned into discrete time blocks during different days of the week, since operating hours for a business can sometimes be different from day to day. One or more processing layers of the model can be applied to these input variables in order to generate an output identifying a likelihood that operating hours of the location entity have changed relative to the initial operating hours.

In some examples, the model is a statistical model and the output of the model is a predictive output. In some examples, the output includes one or more probability scores indicative of a likelihood that operating hours of the location entity have changed relative to initial operating hours. In some examples, the predictive output includes a probability score indicating a likelihood that a closing time for the location entity is earlier or later relative to initial operating hours. In some examples, the predictive output includes a probability score indicating a likelihood that an opening time for the location entity is earlier or later relative to initial operating hours. In some examples, the predictive output includes a probability score indicating a likelihood that a formerly closed location entity is now open or that a formerly open location entity is now closed. In some examples, the predictive output is a simple binary prediction (e.g., "yes" or "no") indicating a likelihood that operating hours have changed. In some examples, a binary prediction can be provided relative to specific aspects of operating hours (e.g., a "yes" or "no" prediction that an opening time and/or a closing time for a location entity is earlier or later relative to initial operating hours.)

Training the model can include using a set of training data for a plurality of location entities. Training data for each location entity can include a collection of time-stamped mobile device location data (e.g., business, location, initial operating hours and number of mobile devices at the location entity within a period of time, other metadata associated with a location entity, other metadata associated with mobile devices at the location entity, other features derived from business or device metadata, etc.) and verified results for updated operating hours from analysis of the collection of time-stamped mobile device location data for that location entity (e.g., confirmation or negation of a predicted change.) In some examples, the model can be a implemented using a machine learning algorithm, such as but not limited to a logistic regression model, a neural network model, and/or a support vector machine (SVM) model.

The determined output from the model can be utilized in a variety of specific applications. In some examples, the operating hours for the location entity can be updated based at least in part on the output of the model. In some examples, the one or more probability scores included in the model output can be compared to one or more threshold values. When probability scores exceed the threshold value(s), a decision is triggered to request verification of whether operating hours for the location entity have in fact occurred. In examples when the output of the model is a binary output (e.g., "yes" or "no"), positive binary predictions (e.g., "yes" outputs) can trigger a verification request. In some examples, this verification can be implemented using manual verification where a human operator contacts the location entity. In response to the manual verification, instructions can be received indicating the verified change in operating hours for the location entity, thus yielding updated operating hours for the location entity. An association between the location entity and the updated operating hours then can be stored in a database. In other examples, a request from a user for business information including operating hours associated with a business or other location entity can be received. The requested business information then can be retrieved from the database that includes the stored associations between the business or other location entity and the updated operating hours for the business or other location entity and provided for display via a user interface.

According to an example embodiment, location data collected from a plurality of mobile devices associated with multiple users at a business is collected and used as a primary input along with other business metadata to a machine learning model. The machine learning model learns patterns of in-store mobile device activity at different times of day and days of the week that are associated with changes in operating hours for the business. Ground-truth data for training the model can include actual human verification of business operating hours. When a high confidence threshold is reached based upon the observed activity of mobile devices in a business indicating that a business may have changed its operating hours in some way (e.g., business has permanently closed or re-opened, business opening hours have been reduced or extended and/or business closing hours have been reduced or extended), this determination triggers manual verification of the operating hours for the business. If the operating hours of the business really did change in the way predicted by the machine learning model, this furnishes a positive example for subsequent training of the machine learning model. If not, this furnishes a negative example for subsequent training of the machine learning model. Over time, the model learns which patterns of in-store activity are associated with changes in operating hours for that business. This allows humans to verify store hours and provide updated merchant records in a manner having increased efficiency.

One example pattern of in-store activity represented by mobile device location data that could indicate a potential change in operating hours for a business corresponds to an increased number of mobile devices detected within the business at a time when the store was thought to have closed. For instance, a business database listing indicates that a retail store has operating hours from 10 am-7 pm on weekdays. The 7 pm closing time can typically be confirmed by about a 90% drop in the number of mobile devices present within the retail store at around 7 pm. More recently, the 90% drop in number of mobile devices present within the retail store occurs around 9 pm as opposed to 7 pm. One or more instances of the disclosed system and method detecting an unusually high number of mobile devices in or around the retail store after the expected closing time of 7 pm can trigger manual review of the store's operating hours by a human. The retail store can be contacted to confirm whether the store's weekday operating hours have been extended. Confirmation is received that the retail store is now operating during extended summer hours of 10 am-9 pm on weekdays. Because the operating hours are confirmed to have been extended, this ground-truth data can be used as a positive example in a statistical model, indicating that the model correctly predicted that store hours had changed based on an additional number of detected mobile devices after initial store closing time.

Another example pattern of in-store activity represented by mobile device location data that could indicate a potential change in operating hours for a business corresponds to an increased number of mobile devices detected in a business that was believed to be permanently closed. The predictive output triggers manual review of operating hours for the business. In this example, the business is contacted and information is received indicating that the business is still closed. The increased number of mobile devices detected in and around the business belonged to construction personnel that were handling renovations for the business space. Because the operating hours of the closed business have not changed, this ground-truth data can be used as a negative example in a statistical model, indicating that the model incorrectly predicted that operating hours had changed based on an additional number of detected mobile devices after store closing time.

In some instances, additional data detected in this latter example can be used as training data for a statistical model to better identify actual changes in operating hours by considering whether the detected number of mobile devices tend to be the same devices on a regular basis. When a substantially similar set of mobile devices are detected day after day in a retail environment, this could indicate workers (e.g., construction or janitorial workers, store employees or the like) as opposed to customers who are more likely to be represented by a detected diversity of mobile devices from day to day. As such, a smaller number of mobile devices determined as present within a store may not yield a high probability score associated with a prediction that the store is re-opened, but a diversity of detected mobile devices could yield a higher probability score associated with a prediction that the store is re-opened.

Referring now to the drawings, exemplary embodiments of the present disclosure will now be discussed in detail. FIG. 1 depicts an example scenario yielding mobile device location data which can be analyzed using machine learning to source hours of operation for a business 102. Although FIG. 1 refers to 102 as a business, the disclosed techniques are equally applicable to other types of location entities including but not limited to any feature, landmark, point of interest (POI), or other object or event associated with a geographic location. For instance, a location entity can include a business, restaurant, place of worship, residence, school, retail outlet, coffee shop, bar, music venue, attraction, museum, theme park, arena, stadium, festival, organization, region, neighborhood, or other suitable points of interest; or subsets of another location entity; or a combination of multiple location entities.

Location markers 104 represent approximate geographic locations contained in, or inferred from, location data reports from various mobile devices associated with a user. Location data reports can be obtained from one or more location devices (e.g., Wi-Fi access point, GPS satellite, cell tower, bluetooth transmitter, beacon device or other device configured to determine location based information) located in proximity to a business 102 that communicate with mobile devices using radios or other suitable communication hardware components. The example of FIG. 1 depicts a first location device 106 and a second location device 108 available at business 102 to communicate with and gather location data from nearby mobile devices. However, it should be appreciated that a single location device, more than two location devices within business 102 or location devices associated with other nearby location entities also can be used to gather location data.

Referring still to FIG. 1, each location marker 104 can correspond to a physical location estimate at a specific snapshot in time determined from time-stamped mobile device location data received from mobile devices associated with one or more users. Each location marker 104 can be determined from location data reports that include a variety of raw data gathered from a mobile device associated with a user. In some examples, raw location data can include multiple overlapping location signals (e.g., GPS output, cell tower strength, Wi-Fi strength, etc.) that are sent from the mobile device to a central server location that analyzes the location signals and related information to determine a current geographic location of the device and user. The determined current geographic location can include specific geographic coordinates and/or street addresses and/or one or more semantic identifiers for a location entity associated with the geographic location, along with optional confidence scores for the determined geographic location. In other examples, a determination of current geographic location can happen partially or entirely at a mobile device as opposed to a remote server location. A variety of conditions can trigger an update to location markers 104, including periodic passage of time (e.g., passage of a predetermined number of seconds or minutes), detected readings on a device location or motion sensor (e.g., an accelerometer), etc. When a condition triggers a location update, raw location data is resent to a remote server or re-analyzed at the mobile device to determine an updated current location for the mobile device and user.

In some examples, specific location data reports analyzed to determine location markers 104 can include one or more of: a mobile device identifier; a user identifier; a time stamp; an estimated physical location (such as device coordinates including latitude, longitude and/or altitude values); an estimate of or model of the likely error in the estimated physical location; one or more raw location sensor readings, indicating, for each of one or more location devices (such as a Wi-Fi access point, GPS satellite, cell tower, or bluetooth transmitter): the identity of the location device, one or more metrics allowing the estimation of distance between the location device and the mobile device, signal reflection arrival times and/or signal strength readings from the location devices; other raw sensor readings (such as accelerometer, gyroscope, barometer, magnetometer); IP address information; geocodes, information about the device's semantic location if known, and a measure of confidence in the semantic location; and/or other information identifying or associated with a particular location. As such, location data reports generally can correspond to data that provides information relevant for establishing the location of a mobile device user at a fixed time and location of a mobile device user. In addition to information from location data reports, the physical location of mobile devices associated with various users as represented by location markers 104 can additionally or alternatively be determined from check-in data from social networks (e.g., Google+, Foursquare, Facebook or other services by which a user indicates their location, such as payment-network transactions) accessed by a user's mobile device.

The mobile device location data such as depicted in FIG. 1 can be used to determine a number of mobile devices present at a given business or other location entity at a given time or period of time. For example, FIG. 1 depicts ten (10) unique mobile device location markers 104 within business 102 at a given time snapshot.

In some examples, location data analysis techniques can be used to help distinguish mobile devices associated with users present at business 102 with other mobile devices that could erroneously be detected as also present. For example, erroneous detection could arise from a person traveling near the business while walking or driving past or from errors in physical location estimation of a person located near business 102 but not present at the business. One technique for limiting erroneous detection in these circumstances can include analysis of speed or other acceleration data from user mobile devices. User devices having greater than a threshold speed or velocity can be identified as actively engaged in a walking speed (e.g., 5 mph) or a driving speed (e.g., 15 mph), which in some examples could result in location data for the user device being discarded, down weighted or otherwise limited. In other examples, clustering, partitioning or segmentation algorithms could be used to group mobile devices having location report data indicating that a mobile device is actually present at business 102 while excluding mobile devices having location data that are considered to be outliers relative to business 102.

Figure 2:
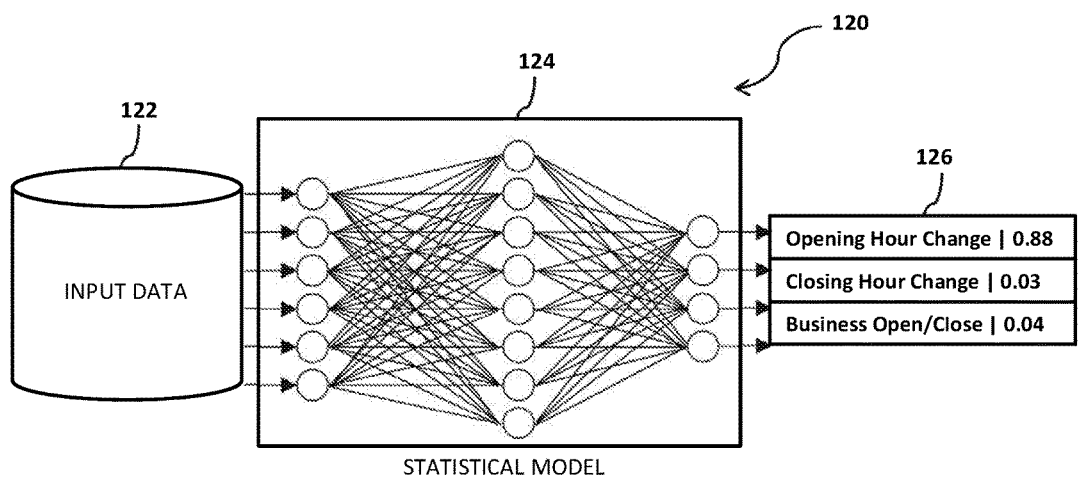
FIG. 2 provides an example overview of a statistical model used for sourcing hours of operation for a location entity according to example aspects of the present disclosure.

Referring now to FIG. 2, system 120 for sourcing hours of operation for a business can include features for processing some or all of the location data gathered and/or determined from user mobile devices. The location data can be stored in database 122 as input to a statistical model 124 for generating predictive outputs 126 relative to operating hours for a business or other location entity. In some examples, database 122 can include location data reports including location histories and corresponding time stamps for user devices. In some examples, database 122 can also include other metadata associated with a location entity, other metadata associated with mobile devices at the location entity, other features derived from business or device metadata, etc. In some examples, database 122 can include a determined number of user devices present at a given business or other location entity based on analysis of location report data.

Referring still to FIG. 2, after the statistical model 124 is applied to input data 122, one or more outputs 126 can be generated. In some examples, outputs 126 of the statistical model include generated prediction of operating hours for a business or other location entity. In other examples, outputs 126 include predictive outputs indicative of likely changes in operating hours relative to a presumed set of initial operating hours for a business. For example, predictive outputs can include but are not limited to an output indicating that a business closing time likely has been extended, an output indicating that a business opening time likely has been extended, an output indicating that a business closing time likely is now earlier, an output indicating that a business opening time likely is now earlier, an output indicating that a formerly open business likely is now closed and/or an output indicating that a formerly closed business likely is now open. Outputs 126 can be binary predictions (e.g., "yes" or "no" outputs) or additionally or alternatively can include probability scores indicative of a likelihood that operating hours for the location entity have changed relative to the initial operating hours.

Figure 3:
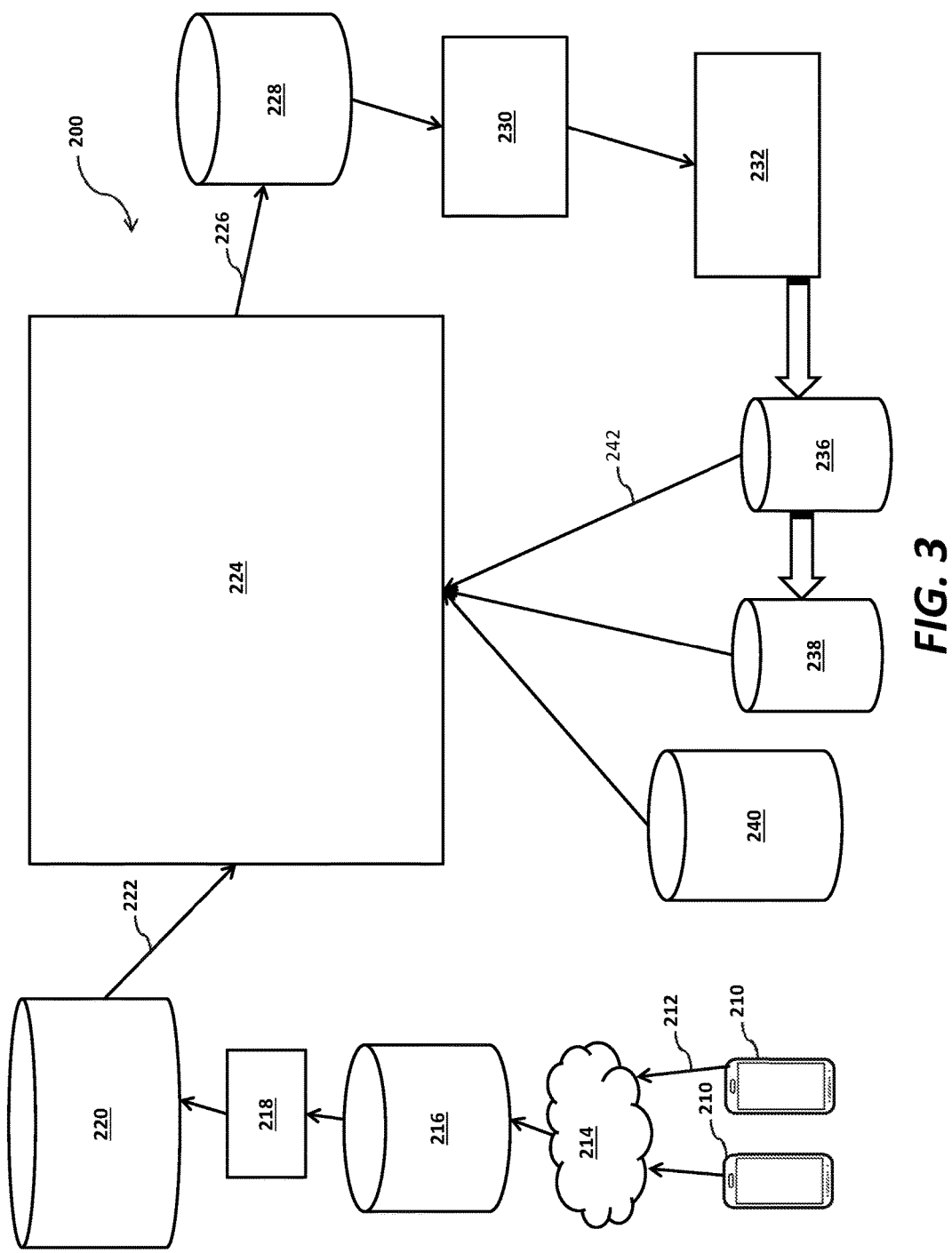
FIG. 3 depicts an example overview of operating flow associated with systems and methods of sourcing hours of operation for a location entity according to example aspects of the present disclosure.

FIG. 3 depicts a more detailed view of the aspects of system 120 of FIG. 2, including an example operating flow 200 for data within systems and methods of sourcing hours of operation for a location entity. Referring now to FIG. 3, mobile devices 210 operating by or otherwise associated with one or more users are equipped with one or more location sensors configured to determine location data and one or more radios or other communication devices for communicating with a network 214. At 212, network 214 regularly gathers time-stamped mobile device location data from mobile devices 210. In some examples, location data gathering at 212 can be part of regular syncing of information between mobile devices 210 and a central server location. One or more portions of the mobile device location data gathered via network 214 can be stored in database 216. In some examples, database 216 stores at least the location histories and times for mobile devices 210.

Time-stamped location data stored in database 216 then can be provided to an optional aggregation algorithm 218, where collected information can be processed to focus on location data without specific user identifiers since the disclosed embodiments need not be tethered to the identity of individual users in order to determine a number of unique devices and/or users present at one or more particular times. In cases where mobile devices 210 send a variety of location signals from different location sensors that may be useful in aggregate to determine device location, aggregation algorithm 218 can also classify which location entity a mobile device was most likely located in at different times as determined from these multiple location signals. A database 220 then can be provided for storing a number of mobile devices that are determined to be present at a particular business or other location entity in a given period of time. Database 220 can additionally or alternatively store non-aggregated individual records of the detected presence of mobile devices 210 in a particular business or other location entity. Additional identifiers for the particular business, time period(s) analyzed, initial operating hours for each particular business, etc. also can be stored within database 220 and provided as input 222 to model 224.

In some examples, model 224 corresponds to a statistical model 124 such as depicted and described relative to FIG. 2, and can employ one or more classification technologies including but not limited to logistic regression models, neural network models, or support vector machine (SVM) models. In other examples, model 224 is generally implemented as a predictive algorithm for analyzing data from database 220 and providing one or more predictive outputs 226. Predictive outputs 226 can include similar outputs 126 as described relative to FIG. 2, including predicted changes in operating hours relative to initial operating hours as well as optional binary outputs and/or probability scores indicative of a likelihood value that operating hours for the location entity have changed relative to the initial operating hours.

Referring still to FIG. 3, one or more predictive outputs 226 from model 224 can be stored in database 228, including but not limited to business identifiers, identified operating hour change types (e.g., earlier opening or closing hours, later opening or closing hours, and/or change in open/closed status) and optional binary indicators or probability scores for the one or more operating hour change types. Predictive outputs indicative of a likely change in operating hours can then trigger an evaluation process step 230 in which a human operator manually evaluates the predictive outputs and optional probability scores to determine if additional verification of a possible change in operating hours is warranted. In some examples, evaluation process step 230 can be implemented automatically instead of manually by comparing a probability score to a threshold value to determine whether there is a sufficient level of likelihood that a change in operating hours has been properly identified. If a likely change in operating hours is confirmed at evaluation process step 230, then verification process step 232 can be helpful to confirm current business details and operating hours. In some examples, verification process step 232 includes contacting a business or other location entity to manually verify the business details including current hours of operation.

Confirmed business listings and current operating hours verified at 232 then can be stored in database 236. In some examples, confirmed business listings and current operating hours from database 236 can then be stored in a larger business database 238 that includes business listings and hours for a larger set of businesses or other location entities than only those having updated operating hours. In some examples, particular business listings and updated operating hours from database 236 can additionally or alternatively be stored in a database 240 that includes still further business metadata, including but not limited to business location identifiers (e.g., street addresses, cities, states, zip codes), business contact information (e.g., phone numbers, email addresses, websites), business categories (e.g., keywords associated with the businesses), business ratings and/or reviews, and other relevant business information accessible by a particular online service or application. Selected data from databases 236, 238 and/or 240 can serve as ground truth for evaluating the accuracy of subsequent predicted changes in business operating hours and can be used as training data 242 for the model 224.

Figure 4:
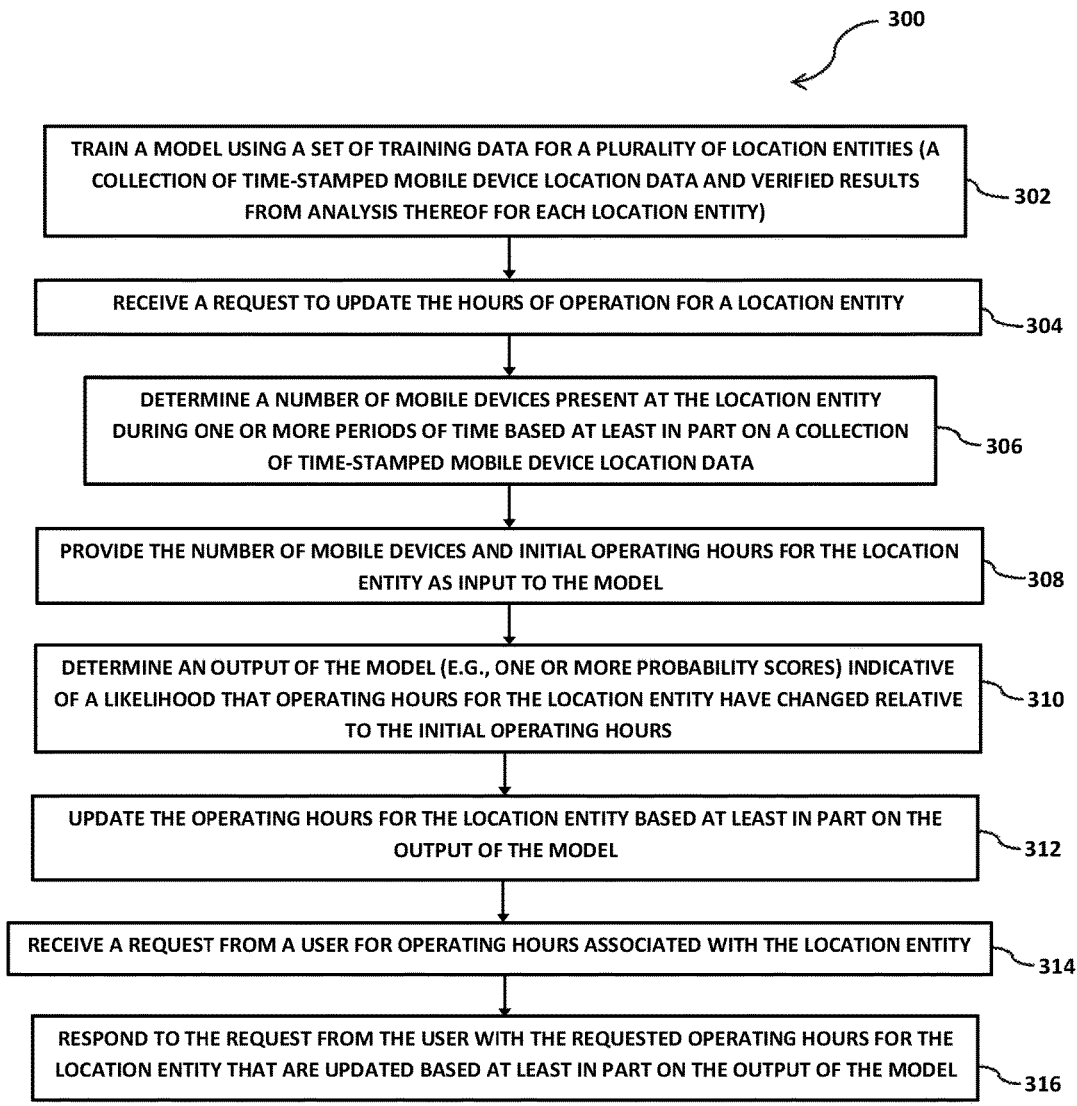
FIG. 4 provides a flow chart of an example method of sourcing hours of operation for a location entity according to example aspects of the present disclosure.

Referring now to FIG. 4, an example method (300) for sourcing hours of operation for a business or other location entity includes training a model at (302). In some examples, the model trained at (302) can be a statistical model configured to generate predictive outputs based on detected patterns of mobile device location data history. In some examples a model trained at (302) can be implemented using a machine learning algorithm, such as but not limited to a logistic regression model, a neural network model, and/or a support vector machine (SVM) model. In general, training the model at (302) includes providing a collection of training data into the machine learning algorithm so that it can build a predictive model that analyzes input data about a business and generates as output a prediction of whether operating hours for the business have changed.

Training the model at (302) can include using a set of training data for a plurality of location entities. Training data for each location entity can include a collection of time-stamped mobile device location data (e.g., business, location, initial operating hours and number of mobile devices at the location entity within a period of time) and verified results for updated operating hours from analysis of the collection of time-stamped mobile device location data for that location entity. Training data can also include metadata about particular categories of businesses or other location entity. Categorical location metadata can help the statistical model to learn associations such as the fact that operating hours for some businesses such as restaurants or café s are more likely to experience frequent changes than entities such as banks or the like. Training data can also include individual records or identifiers of mobile devices present in a particular business. Historical mobile device metadata can help the statistical model to learn associations that may depend on detecting the same or different mobile devices at a location entity across multiple days or time periods. Training data can also include a variety of additional parameters or features derived from raw location data or other metadata associated with locations, devices and/or users. For example, it might make sense for the model to have not just raw timestamps which can be hard to interpret without additional analysis, but pre-processed parameters such data determined for particular days of the week or particular mobile devices, such as number of sessions located in a business, length of sessions, etc.

Each set of training data input used to train the model at (302) can be paired with a corresponding output indicating whether operating hours have changed. These training data input and output pairs can include example ground-truth data furnishing both positive examples (e.g., confirmation indications that operating hours have changed based on training data input) as well as negative examples (e.g., negation indications that operating hours have not changed based on training data input).

Method (300) also can include receiving a request at (304) to update the hours of operation for a location entity. Requests received at (304) can be initiated either manually or automatically in a variety of different manners. For example, some update requests received at (304) can be manually initiated upon receiving a request from a customer, business owner, or other individual indicating that listed operating hours may be incorrect for a particular business or other location entity. Other update requests received at (304) can be automatically initiated on a periodic schedule (e.g., daily, weekly, monthly, quarterly, annually, etc.) to review and update hours of operation for some or all business listings in a database. Requests received at (304) can be initiated automatically based on detected triggers such as a determined number of mobile devices present at a business or other location entity outside presumed hours of operation. In some examples, a frequency of updates requested at (304) can be customized based on a level of growth or change experienced in particular geographic areas. For example, updates requested at (304) can be initiated more regularly for businesses in geographic areas that are experiencing relatively high levels of business growth or change.

When a request to update hours of operation for a particular location entity has been received at (304), a number of mobile devices present at or near the location entity during one or more periods of time can be determined at (306). In some examples, the particular periods of time analyzed at (306) can focus on periods of time that are within a window around presumed or initial opening and closing times for particular days of the week. In other examples, the particular periods of time analyzed at (306) can include different buckets of time corresponding to different time intervals (e.g., predefined periods of minutes and/or hours during each 24-hour period of time in a day). The one or more periods of time also can be partitioned into discrete time blocks during different days of the week, since operating hours for a business can sometimes be different from day to day. Different periods of time also can be defined relative to specific categories such as weekdays, weekends, seasons of the year and/or holiday seasons or other categorical classification of times or days.

The determination at (306) of a number of mobile devices present at a particular location entity can be based at least in part on a collection of time-stamped mobile device location data. In some examples, a particular location entity can be defined in terms of a known physical area based on predetermined boundary information available for the location entity. For example, boundary information for business 102 in FIG. 1 can be used to define a physical area for the business 102 as including the entire area depicted with diagonal shading. In other examples, a particular location entity can be defined in terms of known coordinates for a location entity (e.g., known latitude/longitude/altitude values) and a corresponding radius around the known coordinates. A particular location entity also can be defined in terms of identifiers for particular location devices that are known to correspond with the particular location entity (e.g., known Wi-Fi access points located in the location entity, cell towers located near the location entity, etc.). A number of mobile devices determined at (306) to be present at a particular location entity can be identified in some instances by comparing an estimated geographic location of the mobile device, identified location devices communicating with the mobile device, or a variety of other available metadata with similar data defining the location entity.

Referring still to FIG. 3, the number of mobile devices present at a location entity during one or more periods of time as determined at (306) along with other optional time-stamped location data for the mobile devices can be provided as input to a model at (308). Time-stamped location data provided as input to a model at (308) can include but is not limited to metadata associated with one or more location entities (e.g., identifiers, categories, metadata associated with individual records or identifiers of mobile devices present at a particular location entity, and additional parameters or features derived from raw location data or other metadata associated with locations, devices and/or users. Any of the particular metadata examples described as helpful data inputs used to train the model at (302) can also be identified and provided as input to the model at (308).

In some examples, a presumed set of initial operating hours also can be provided as input to a model at (308). In some instances, the presumed set of initial operating hours can be obtained from a database of business listings that include stored associations between the listings and initial operating hours for the listings. In other instances, the presumed set of initial operating hours is unknown. In some instances, operating hours that are initially unknown can be estimated based on identified numbers of mobile devices determined at (306). The model receiving inputs at (308) can be the same model trained at (302).

One or more processing layers of the model can be applied to the input variables provided at (308) in order to determine an output at (310) identifying a likelihood that operating hours of the location entity have changed relative to the initial operating hours. In some examples, the model is a statistical model and the output of the model determined at (310) is a predictive output. In some examples, the output determined at (310) includes one or more probability scores indicative of the likelihood that operating hours of the location entity have changed relative to initial operating hours. In some examples, a predictive output determined at (310) includes a binary prediction (e.g., "yes" or "no") indicating a likelihood that operating hours have changed relative to initial operating hours. In some examples, a predictive output determined at (310) includes a probability score indicating a likelihood that a closing time for the location entity is earlier or later relative to initial operating hours. In some examples, a predictive output determined at (310) includes a probability score indicating a likelihood that an opening time for the location entity is earlier or later relative to initial operating hours. In some examples, a predictive output determined at (310) includes a probability score indicating a likelihood that a formerly closed location entity is now open or that a formerly open location entity is now closed.

Factors for weighting different processing decisions and/or probabilities associated with particular predictive outputs determined at (310) can be customized depending on a variety of different relevant metadata associated with mobile devices detected as present at or near a given location entity. In some examples, relevant metadata includes unique identifier metadata associated with detected mobile devices. If different unique identifiers are detected on different days and times, then it may be more likely that customers are present within a location entity. If the same unique identifiers are detected on different days and times, then it may be more likely that employees or others are present within a location entity. In retail stores, detected presence of likely customers is a stronger indicator that the retail store is open than detected presence of likely employees, construction or janitorial workers, etc.

Other factors for weighting different processing decisions and/or probabilities associated with particular predictive outputs determined at (310) can include speed of a mobile device, persistence of a mobile device, detection of one or more mobile device(s) during highly unlikely operating hours, and/or detected linking of mobile devices via contacts, social networks or the like. Speed of mobile devices can help distinguish between mobile devices that likely belong to a user walking or driving past a business as opposed to customer mobile devices. Persistence indicators for a mobile device can help identify mobile devices that have been present at a location entity for an extended period of time, potentially indicating that a mobile device more likely belongs to an employee than a customer. Business categories can be analyzed to identify unlikely hours of operation. For instance, a library may rarely be open at 2 am, while many bars can be open late. Unlikely operating hours can be used as additional training data for helping categorize a small number of detected mobile devices during those times as more likely belonging to janitorial staff or other people than customers. Indicators of mobile device linking can include data indicating that a group of friends linked on a social network are all visiting the same restaurant during a period of time. These linking indicators can be used in some examples to increase probability scores indicating that customers are present in the restaurant. Numerous other weighting and indication examples can be used to enhance training data and mobile device data analysis in accordance with the disclosed techniques.

Referring still to FIG. 4, the output(s) from the model determined at (310) can be utilized in a variety of specific applications. In some examples, the operating hours for the location entity can be updated at (312) based at least in part on the output of the model. In some examples, operating hours that are updated at (312) are stored in one or more databases. In some examples, a request from a user for operating hours associated with a business or other location entity can be received at (314). A response to the request received at (314) can be communicated at (316), including the requested operating hours for the location entity that are updated at (312) based at least in part on the output of the model determined at (310).

Figure 5:
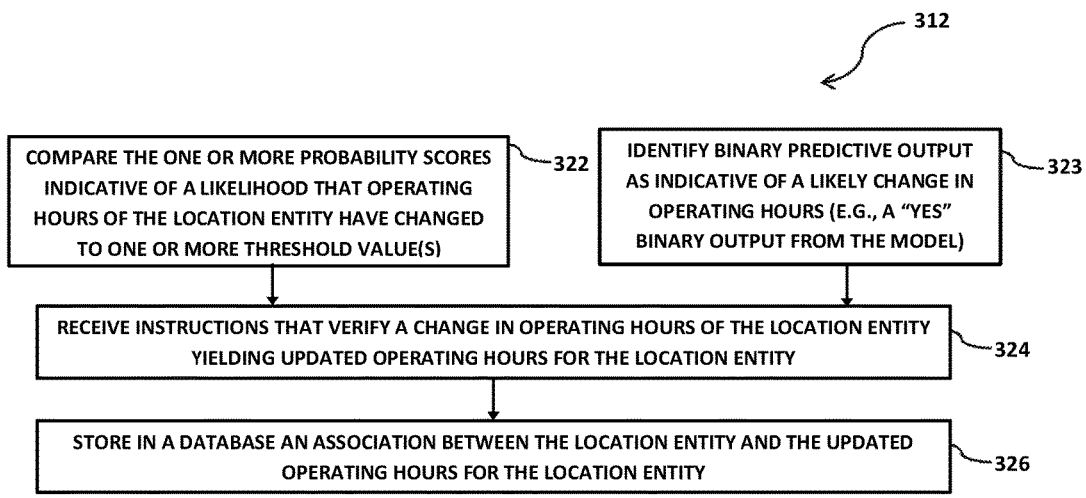
FIG. 5 provides a flow chart of an example method of updating hours of operation for a location entity according to example aspects of the present disclosure.

A more particular example of how updating (312) can occur is provided in FIG. 5. In this example, updating (312) can include identifying that a change in operating hours has likely occurred. In one example, this can involve comparing (322) one or more probability scores included in the model output determined at (308) to one or more threshold values. In another example, this can involve identifying (323) a binary output determined at (308) as indicative of a likely change in operating hours (e.g., a "yes" binary output from the model). When probability scores exceed the threshold value(s) or when binary outputs indicate a change in operating hours, a decision is triggered to request verification of whether operating hours for the location entity have in fact occurred. In some examples, this verification can be implemented using manual verification where a human operator contacts the location entity and/or customers of the location entity. In other examples, an automated system contacts the location entity and/or customers of the location entity. In response to the verification, instructions can be received at (324) indicating the verified change in operating hours for the location entity, thus yielding updated operating hours for the location entity. An association between the location entity and the updated operating hours then can be stored in a database at (326).

Figure 6:
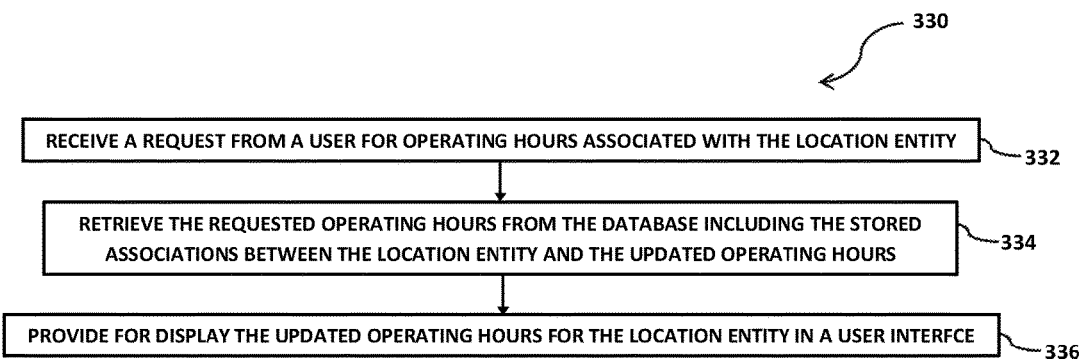
FIG. 6 provides a flow chart of an example method of coordinating a request from a user for operating hours associated with the location entity according to example aspects of the present disclosure.

FIG. 6 depicts a still further example aspect of the present disclosure, in which requests for business information including operating hours are received and processed to include updated information available through the disclosed systems and methods. In an example method (330), a request from a user for business information including operating hours associated with a business or other location entity can be received at (332). The requested business information then can be retrieved at (334) from a database that includes stored associations between the business or other location entity and the updated operating hours for the business or other location entity. The updated operating hours for a business then can be provided for display at (336) to the requesting user via a user interface or other display option. Additional business information for a business or other location entity beyond updated operating hours (e.g., location information, contact information, etc.) also can be retrieved at (334) and provided for display to a user at (336).

Figure 7:
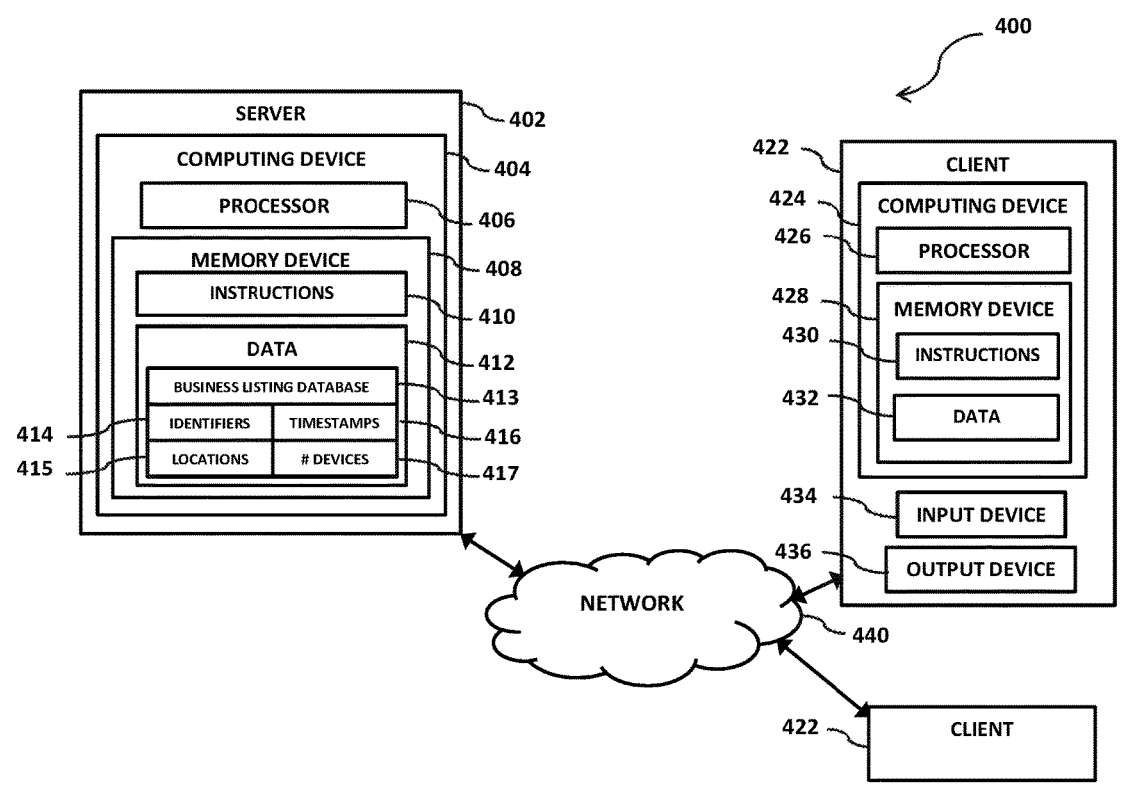
FIG. 7 provides an example overview of system components for use in implementing a method of sourcing hours of operation for a location entity according to example aspects of the present disclosure.

FIG. 7 depicts a computing system 400 that can be used to implement the methods and systems for sourcing hours of operation for a location entity according to example embodiments of the present disclosure. The system 400 can be implemented using a client-server architecture that includes a server 402 and one or more clients 422. Server 402 may correspond, for example, to a web server hosting a search engine application as well as optional machine learning tools for training and determining changes in hours of operation. Client 422 may correspond, for example, to a personal communication device such as but not limited to a smartphone, navigation system, laptop, mobile device, tablet, wearable computing device or the like configured for requesting business-related search query information including hours of operation for businesses.

Each server 402 and client 422 can include at least one computing device, such as depicted by server computing device 404 and client computing device 424. Although only one server computing device 404 and one client computing device 424 is illustrated in FIG. 7, multiple computing devices optionally may be provided at one or more locations for operation in sequence or parallel configurations to implement the disclosed methods and systems of sourcing hours of operation. In other examples, the system 400 can be implemented using other suitable architectures, such as a single computing device. Each of the computing devices 404, 424 in system 400 can be any suitable type of computing device, such as a general purpose computer, special purpose computer, navigation system (e.g. an automobile navigation system), laptop, desktop, mobile device, smartphone, tablet, wearable computing device, a display with one or more processors, or other suitable computing device.

The computing devices 404 and/or 424 can respectively include one or more processor(s) 406, 426 and one or more memory devices 408, 428. The one or more processor(s) 406, 426 can include any suitable processing device, such as a microprocessor, microcontroller, integrated circuit, logic device, one or more central processing units (CPUs), graphics processing units (GPUs) dedicated to efficiently rendering images or performing other specialized calculations, and/or other processing devices. The one or more memory devices 408, 428 can include one or more computer-readable media, including, but not limited to, non-transitory computer-readable media, RAM, ROM, hard drives, flash drives, or other memory devices. In some examples, memory devices 408, 428 can correspond to coordinated databases that are split over multiple locations.

The one or more memory devices 408, 428 can store information accessible by the one or more processors 406, 426, including instructions that can be executed by the one or more processors 406, 426. For instance, server memory device 408 can store instructions for implementing an algorithm for detecting changes in operating hours configured to perform various functions disclosed herein. The client memory device 428 can store instructions for implementing a browser or application that allows a user to request information from server 402, including business listings including hours of operation, related business information and the like.

The one or more memory devices 408, 428 also can include data 412, 432 that can be retrieved, manipulated, created, or stored by the one or more processors 406, 426. The data 412 stored at server 402 can include, for instance, a database 413 of listing information for businesses or other location entities. In some examples, business listing database 413 can include more particular subsets of data, including but not limited to identifier data 414 identifying the names of various businesses, location data 415 identifying the geographic location of the businesses, timestamp data 416 identifying times associated with the location data 415, and device number data 417 identifying a determined number of devices at each business during one or more periods of time using aspects of the disclosed techniques.

Computing devices 404 and 424 can communicate with one another over a network 440. In such instances, the server 402 and one or more clients 422 can also respectively include a network interface used to communicate with one another over network 440. The network interface(s) can include any suitable components for interfacing with one more networks, including for example, transmitters, receivers, ports, controllers, antennas, or other suitable components. The network 440 can be any type of communications network, such as a local area network (e.g. intranet), wide area network (e.g. Internet), cellular network, or some combination thereof. The network 440 can also include a direct connection between server computing device 404 and client computing device 424. In general, communication between the server computing device 404 and client computing device 424 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The client 422 can include various input/output devices for providing and receiving information to/from a user. For instance, an input device 434 can include devices such as a touch screen, touch pad, data entry keys, and/or a microphone suitable for voice recognition. Input device 434 can be employed by a user to request business search queries in accordance with the disclosed embodiments, or to request the display of image inputs and corresponding classification label and/or confidence score outputs generated in accordance with the disclosed embodiments. An output device 436 can include audio or visual outputs such as speakers or displays for indicating outputted search query results, business listing information, and/or image analysis outputs and the like.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

It will be appreciated that the computer-executable algorithms described herein can be implemented in hardware, application specific circuits, firmware and/or software controlling a general purpose processor. In one embodiment, the algorithms are program code files stored on the storage device, loaded into one or more memory devices and executed by one or more processors or can be provided from computer program products, for example computer executable instructions, that are stored in a tangible computer-readable storage medium such as RAM, flash drive, hard disk, or optical or magnetic media. When software is used, any suitable programming language or platform can be used to implement the algorithm.

While the present subject matter has been described in detail with respect to specific example embodiments thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of sourcing hours of operation for a location entity, comprising:

receiving, by one or more computing devices, a request to update the hours of operation for a location entity;

determining, by the one or more computing devices, a number of mobile devices present at the location entity during one or more periods of time based at least in part on a collection of time-stamped mobile device location data, wherein the collection of time-stamped mobile device location data identifies one or more mobile devices associated with one or more users as present at the location entity;

providing, by the one or more computing devices, the number of mobile devices and initial operating hours for the location entity as input to a model, wherein the model comprises a statistical model trained to generate one or more predictive outputs indicative of change to initial operating hours of other location entities based on detected patterns of in-store mobile device activity learned from training data, wherein the training data comprises a collection of mobile device location data including number of mobile devices and verified results for updated operating hours for a plurality of other location entities;

determining, by the one or more computing devices, an output of the model indicative of a likelihood that operating hours for the location entity have changed relative to the initial operating hours; and updating, by the one or more computing devices, the operating hours for the location entity based at least in part on the output of the model.

2. The computer-implemented method of claim 1, further comprising:

receiving, by the one or more computing devices, a request from a user for operating hours associated with the location entity; and responding, by the one or more computing devices, to the request from the user with the requested operating hours, wherein the requested operating hours comprise the operating hours for the location entity that are updated based at least in part on the output of the model.

3. The computer-implemented method of claim 1, wherein the output of the model comprises one or more probability scores indicative of a likelihood that operating hours for the location entity have changed relative to the initial operating hours.

4. The computer-implemented method of claim 3, wherein updating, by the one or more computing devices, the operating hours for the location entity based at least in part on the output of the model, comprises:

receiving, by the one or more computing devices, instructions that verify a change in operating hours of the location entity yielding updated operating hours for the location entity; and storing in a database, by the one or more computing device, an association between the location entity and the updated operating hours for the location entity.

5. The computer-implemented method of claim 4, further comprising:

receiving, using the one or more computing devices, a request from a user for operating hours associated with the location entity;

retrieving, using the one or more computing devices, the requested operating hours from the database including the stored associations between the location entity and the updated operating hours for the location entity; and providing for display, using the one or more computing devices, the updated operating hours for the location entity in a user interface accessible by the user.

6. The computer-implemented method of claim 4, wherein the location entity comprises a business and wherein the database comprises business information for the location entity as well as the association between the business and the updated operating hours for the business.

7. The computer-implemented method of claim 1, further comprising training, by the one or more computing devices, the model using a set of training data for a plurality of location entities, wherein the training data for each location entity includes a collection of time-stamped mobile device location data for that location entity and verified results for updated operating hours resulting from analysis of the collection of time-stamped mobile device location information for that location entity.

8. The computer-implemented method of claim 1, wherein the output from the model comprises a probability score indicating a likelihood that a closing time for the location entity is earlier or later.

9. The computer-implemented method of claim 1, wherein the output from the model comprises a probability score indicating a likelihood that an opening time for the location entity is earlier or later.

10. The computer-implemented method of claim 1, wherein the output from the model comprises a probability score indicating a likelihood that a formerly closed location entity is now open or a likelihood that a formerly open location entity is now closed.

11. The computer-implemented method of claim 1, wherein the model comprises a machine learning algorithm structured as one of a logistic regression model, a neural network model or a support vector machine (SVM) model.

12. The computer-implemented method of claim 1, wherein the location entity comprises a business.

13. The computer-implemented method of claim 1, wherein determining a number of mobile devices present at the location entity during one or more periods of time, providing the determined number of mobile devices and initial operating hours for the location entity as input to a model, and determining an output of the model are separately performed for different days of the week.

14. A computing device, comprising:

one or more processors; and one or more memory devices, the one or more memory devices storing computer-readable instructions that when executed by the one or more processors, cause the one or more processors to perform operations, the operations comprising:

receiving a request to update the hours of operation for a location entity;

determining a number of mobile devices present at the location entity during one or more periods of time based at least in part on a collection of time-stamped mobile device location data, wherein the collection of time-stamped mobile device location data identifies one or more mobile devices associated with one or more users as present at the location entity;

providing the number of mobile devices and initial operating hours for the location entity as input to a model, wherein the model comprises a statistical model trained to generate one or more predictive outputs indicative of change to initial operating hours of other location entities based on detected patterns of in-store mobile device activity learned from training data, wherein the training data comprises a collection of mobile device location data including number of mobile devices and verified results for updated operating hours for a plurality of other location entities;

determining an output of the model indicative of a likelihood that operating hours for the location entity have changed relative to the initial operating hours; and updating the operating hours for the location entity based at least in part on the output of the model.

15. The computing device of claim 14, wherein the location entity comprises a business and wherein the operations further comprise:

storing in a database an association between the business and the updated operating hours for the business;

receiving a request from a user for operating hours associated with the business; and responding to the request from the user with the requested operating hours, wherein the requested operating hours comprise the operating hours for the business that are updated based at least in part on the output of the model.

16. The computing device of claim 14, wherein the output of the model comprises one or more probability scores indicative of a likelihood that operating hours for the location entity have changed relative to the initial operating hours.

17. The computing device of claim 14, wherein the operation of updating the operating hours for the location entity based at least in part on the output of the model comprises:

comparing the one or more probability scores indicative of a likelihood that operating hours of the location entity have changed to one or more threshold values;

receiving instructions that verify a change in operating hours of the location entity yielding updated operating hours for the location entity; and storing in a database an association between the location entity and the updated operating hours for the location entity.

18. One or more tangible, non-transitory computer-readable media storing computer-readable instructions that when executed by one or more processors cause the one or more processors to perform operations, the operations comprising:

receiving a request to update the hours of operation for a location entity;

determining a number of mobile devices present at the location entity during one or more periods of time based at least in part on a collection of time-stamped mobile device location data, wherein the collection of time-stamped mobile device location data identifies one or more mobile devices associated with one or more users as present at the location entity;

providing the number of mobile devices and initial operating hours for the location entity as input to a model, wherein the model comprises a statistical model trained to generate one or more predictive outputs indicative of change to initial operating hours of other location entities based on detected patterns of in-store mobile device activity learned from training data, wherein the training data comprises a collection of mobile device location data including number of mobile devices and verified results for updated operating hours for a plurality of other location entities;

determining an output of the model indicative of a likelihood that operating hours for the location entity have changed relative to the initial operating hours; and updating the operating hours for the location entity based at least in part on the output of the model.

19. The one or more tangible, non-transitory computer-readable media of claim 18, wherein the location entity comprises a business and wherein the operations further comprise:

storing in a database an association between the business and the updated operating hours for the business;

receiving a request from a user for operating hours associated with the business; and responding to the request from the user with the requested operating hours, wherein the requested operating hours comprise the operating hours for the business that are updated based at least in part on the output of the model.

20. The one or more tangible, non-transitory computer-readable media of claim 18, wherein the output of the model comprises one or more probability scores indicative of a likelihood that operating hours for the location entity have changed relative to the initial operating hours.

* * * * *